United States Patent [19]

O'Gwynn

[11] Patent Number: 4,970,581
[45] Date of Patent: Nov. 13, 1990

[54] CIRCUIT FOR AND METHOD OF DETECTING COLOR FIELD SEQUENCE IN A COLOR VIDEO SIGNAL

[75] Inventor: David C. O'Gwynn, Evergreen, Colo.
[73] Assignee: Ampex Corporation, Redwood City, Calif.
[21] Appl. No.: 242,929
[22] Filed: Sep. 9, 1988
[51] Int. Cl.⁵ .............................................. H04N 9/44
[52] U.S. Cl. .......................................... 358/17; 358/19
[58] Field of Search ..................................... 358/17, 19

[56] References Cited

U.S. PATENT DOCUMENTS

| | | | |
|---|---|---|---|
| 4,532,547 | 7/1985 | Bennett | 358/148 |
| 4,734,757 | 3/1988 | Akiyama | 358/19 |
| 4,788,585 | 11/1988 | Suzuki | 358/10 |

Primary Examiner—James J. Groody
Assistant Examiner—Robert M. Bauer
Attorney, Agent, or Firm—George B. Almeida; Douglas M. Gilbert

[57] ABSTRACT

A multi-standard color field sequence detector includes an analog and a digital processor section, wherein the analog processor section receives a reference video input and provides the signals necessary to drive the digital processor section. A correlator control circuit counts an exact number of 13.5 MHz reference clock cycles, and then supplies a start signal to a burst correlator circuit, which takes samples of a plurality of cycles of burst and correlates the results to determine the polarity of the burst samples. If they are of a first polarity, a count value of corresponding polarity is supplied. If they are of the opposite polarity, a count value of the corresponding opposite polarity is supplied. The sequence of the polarities of the final counts are detected to identify the color field 1 for the standard being used.

21 Claims, 2 Drawing Sheets

CIRCUIT FOR AND METHOD OF DETECTING COLOR FIELD SEQUENCE IN A COLOR VIDEO SIGNAL

BACKGROUND AND SUMMARY OF THE INVENTION

The invention relates to color field sequence detection and in particular, to a universal standard, digital circuit for detecting a specific color field in the color field sequence of a color television signal, using a clock that is unrelated to color subcarrier but which is locked to horizontal sync, wherein the usual phase locked loop is eliminated.

In the field of color television, the detection and identification of a specific color field in the color field sequence of an NTSC, PAL, etc., color television standard, is a well known process that is required when performing such processes as color field editing, color framing of videotape recorders, time base correction of color signals, etc. For example, a time base corrector must convert any off-tape field to the field type dictated by the station reference. Likewise, the proper color field must be known when performing an edit process to prevent the generation of undesirable picture shifts.

In turn, color field detection requires the identification of a phase relationship between the color subcarrier signal and the horizontal sync. This relationship for the color fields of the color field sequence in an incoming video reference signal, differs in accordance with the standard.

Because of the television raster scan system of interlace, adjacent fields are offset vertically by one-half scan line. In addition, the color encoding structure is not identical on corresponding lines of different fields. Thus, for example, in NTSC there are two unique color frames each having two interlaced fields. The fields are normally indicated as fields 1 and 2 of color frame A and fields 3 and 4 of color frame B. Fields 1 and 3 differ in that the encoding chroma subcarrier phase will be 180° offset for a given line on field 1 compared to the corresponding line on field 3. The same is true when fields 2 and 4 are compared. In PAL, the sync-to-subcarrier relationship and the V axis phase gives four unique frames (eight unique fields).

Typically, detection of the phase relationship of previous mention is performed in an analog domain by using color burst as a reference to synthesize phase coherent subcarrier, and comparing the latter signal to the edge of horizontal sync during the proper line of each video frame. When the comparison meets the selected specification for subcarrier-to-horizontal sync (ScH) phase, detection of the specified color field, generally color field 1, can be made consistently.

Analog color field sequence detectors presently found, for example, in videotape recorders, editors, etc., require significant analog circuitry. This, in turn, maximizes the susceptibility of the detector to the noise, drift, etc., problems commonly associated with analog circuits. In addition, most of the circuitry must be duplicated for each standard which is handled by the apparatus, thus increasing the components, the complexity, the space required and the costs.

In the analog system, a phase locked loop is employed to continuously re-generate the color subcarrier in a phase locked condition over successive intervals of horizontal lines. The synthesized phase coherent subcarrier then is compared to the edge of horizontal sync during the proper line of each video field. As is well known, phase locked loops are susceptable to the problems of noise, drift, added component count and difficulty in board layout.

In a recent development, a digital color field sequence detector provides color field 1 detection via digital circuitry, wherein the usual phase locked loop has been eliminated. To this end, a reference signal of subcarrier frequency is generated internally starting with the falling edge of H-sync, using a crystal oscillator. The phase of this reference signal then is compared to the incoming burst of the same line when it occurs. Since burst occurs a relatively short time after H-sync, a free-running time base is sufficiently accurate to allow making a phase comparison without the need for phase locked loop circuitry. Such a digital color field 1 detector is described in copending patent application Ser. No. 242,946, filed Sept. 9, 1988, and assigned to the same assignee as this application.

However, this prior digital system requires a number of reference clocks, one for each color television standard. In addition, due to the fact that the reference clock oscillator source is free-running, the system inherently suffers from a rather large measurement uncertainty which, in turn, makes it difficult to adjust. It follows that the system is somewhat complex and requires a relatively large number of components.

The present invention circumvents the disadvantages of the above digital as well as analog color field sequence detector circuits, while providing the inherent advantages of a digital circuit which detects color field 1 with relatively fewer digital components, and which further eliminates the need for the phase locked loop of the analog systems.

More particularly, in a video system that includes a clock source which is phase locked to horizontal sync, (that is, is based on a line locked sample system) and which has a frequency sufficiently higher than the color subcarrier frequency, the invention contemplates a number of advantages. For example, the invention does not require additional reference clock oscillators, or the extra dividers required to generate several reference clocks from a single crystal oscillator. The invention uses one reference clock source for the NTSC, PAL and PAL-M color television standards. In addition, the invention technique inherently provides more accurate phase measurements and as such is easier to adjust. Further, the present digital color field 1 detector requires fewer components and thus requires less board space, is easier to lay out and readily lends itself to implementation as a gate array.

More particularly, an analog processor section includes a sync stripper and an odd/even field detector to provide composite sync and odd/even field signals, and a burst processor to provide a squared burst signal. In addition, a burst invert signal and a system reference clock are provided from the system timing generator, wherein the detector circuitry is locked to horizontal sync and is the same frequency regardless of the color television standard. A digital processor section includes a line selector circuit for providing a signal indicating a selected video line signal during which detection is made, and a gate signal for providing a one line gate pulse, or window, for limiting the color field 1 signal to one line duration. The digital processor section further includes a correlator control circuit responsive to the selected line signal as well as to the standard, for counting an exact number of the system reference clock cycles, and to then enable operation of a burst correlator circuit. The number of clock cycles to be counted varies with the standard, whereby a point near the center of burst may be located by counting the number of clock cycles associated with the standard being used. The correlator control circuit supplies a correlator start signal of selected logic level to enable the burst correlator circuit at the center of burst. The correlator circuit takes a sample in each of three consecutive similar half-cycles of burst, and then correlates the results to determine if the burst samples are positive or negative. By way of example, if positive, the final count of three samples is a +3 and, if negative, the final count of three samples is a −3. If three samples are taken, any count other than ±3. indicates an invalid burst, or improper adjustment.

A state machine monitors the sequence of positive and negative count values. When the proper sequence corresponding to the standard is detected, a color field pulse is supplied to a flywheel which, in turn, supplies a color field 1 identification logic level for the duration of color field 1.

Thus, it may be seen that the reference signal generation, phase detection, sequence detection and timing generation all are performed in the digital domain with its inherent advantages of ease of board layout, lower component count, less board space requirements, adaptability to multiple color television standards and operating stability, as well as the elimination of the phase locked loop as previously mentioned.

BRIEF DESCRIPTION OF THE DRAWINGS

FIGS. 3A and 3B are graphs depicting the timing relationship between the color burst signal and the sample pulses derived from the line locked reference clock source.

DESCRIPTION OF THE PREFERRED EMBODIMENTS

Figure 1:
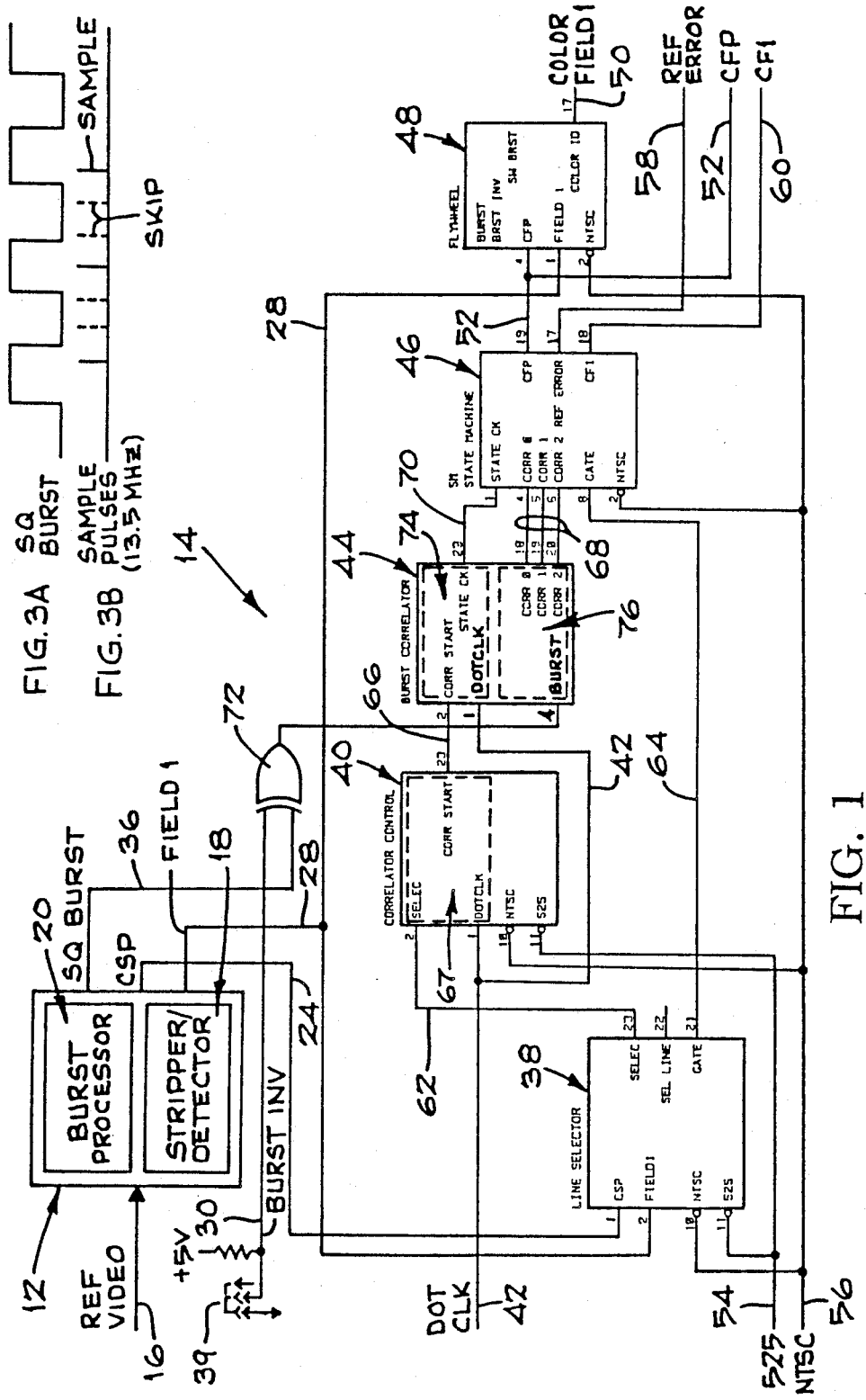
FIG. 1 is a block diagram of an embodiment of the invention combination in its environment.

As depicted in FIG. 1, there are two major sections in the color field 1 detector of description herein. An analog processor section 12 and a digital processor section 14. The analog processor section 12 receives, on a line 16, a reference video signal (REF VIDEO) which may comprise a color bar or black burst signal, and provides some of the necessary digital signals to drive the digital processor section 14. The heart of the analog processor section 12 is a sync stripper/odd/even field detector circuit 18 and a burst processor circuit 20. The circuit 18 receives the REF VIDEO signal and provides output signals of composite sync (CSP) on a line 24, and FIELD 1 on a line 28 as shown further in FIG. 2.

The digital processor section 14 requires an input of a squarewave representation of color burst that has been shifted in phase relative to the input burst. This phase shift is necessary to compensate for propagation delays in the sync stripper/odd/even field detector circuit 18 and the following logic circuitry. To this end, the burst processor circuit 20 includes the reference video signal on the line 16. A burst slicer 34 is coupled to the phase shifter 32 and supplies a squared burst signal (SQ BURST) to the digital processor section 14 via a line 36.

In addition, as depicted in FIG. 1, a burst invert control signal (BURST INV) is supplied on a line 30 extending from the system, via a jumper 39 selected during detector setup. Also, a reference clock signal (DOT CLK) of, for example, 13.5 megaHertz (MHz), is supplied from a system timing source (not shown) on a line 42, is locked to horizontal line rate, and as such is used as a reference clock for all color television standards.

Referring to FIG. 1, the digital processor section 14 comprises essentially five circuits and includes a line selector circuit 38, a correlator control circuit 40, a burst correlator circuit 44, a state machine circuit 46 and a flywheel circuit 48. The digital processor section 14 receives the three inputs thereto from the analog processor section 12, namely CSP on line 24, FIELD 1 on line 28, and SQ BURST on line 36, and the two inputs DOT CLK and BRST INV from the system on lines 42 and 30. In turn, section 14 provides four outputs which comprise the COLOR FIELD 1 signal on a line 50, a color field pulse (CFP) on a line 52, a reference error signal (REF ERR) on a line 58, and a color field 1 signal (CF1) on a line 60. COLOR FIELD 1 occurs every fourth field for the NTSC color television standard, and every eighth field for the PAL, PAL-M standard. FW RST indicates whether or not a valid reference signal is present.

Considering the schematic of the digital processor circuit 14 in greater detail, the line selector circuit 38 receives CSP on the line 24 and FIELD 1 on line 28, and also receives on a line 54 a 525 signal indicative of a 525 or 625 line standard, and a NTSC signal on a line 56. Both of the latter signals identify the NTSC/PAL/PAL-M color television standard being used. Circuit 38 provides a selected video line signal (SELEC) on a line 62, which herein identifies the video line 22 for the NTSC color television standard, and the video line 21 for the PAL and PAL-M standards, via selected logic levels. A gate signal (GATE) is provided by the line selector circuit 38 on a line 64, and provides a gate pulse, or window, of one horizontal line duration, one line after the occurrence of the SELEC signal. GATE is ANDed with the CFI signal in the state machine 46 to provide the CFP signal for a one line duration only.

Thus the line selector circuit 38 directs the correlator control circuit 40 which, in turn, enables the burst correlator circuit 44 to sample the color burst on a selected line of every odd field. The NTSC and 525 inputs supplied to the control circuit 40 determine which line will be sampled. At the beginning of the selected line, SELEC goes true and remains there until the next even field. GATE goes high for one video line on the video line after SELEC goes true.

The correlator control circuit 40 receives the DOT CLK signal from system timing on the line 42, the SELEC signal on the line 62, a NTSC signal on the line 56, and the 525 signal on the line 54, and provides a correlator start signal (CORR START) on a line 66. The function of the correlator control circuit 40 is to count
an exact number of 13.5 MHz clock cycles of DOT CLK, and then signal the burst correlator circuit 44 to start sampling the burst. Because the 13.5 MHz reference clock is phase locked to horizontal sync, it is possible to repeatedly locate a given point in a video line by just counting the reference clock cycles. In this case it is possible to locate a point near the center of burst by counting, via a counter (illustrated at 67), 81 clock cycles for NTSC, 84 clock cycles for PAL, or 102 clock cycles for PAL-M. At the given point near the respective burst center, the CORR START signal goes true. It remains true until SELEC goes false. At that time the counter is reset, but does not count again until SELEC goes true again.

In response to CORR START, the burst correlator circuit 44 takes samples of three cycles of burst, correlates the results, and signals the state machine 46 to process the result. To this end, SQ BURST and BRST INV are supplied to an EX OR gate 72 which passes SQ BURST, or inverts it, depending upon the position of the jumper 39 and thus the state of BRST INV. The position is selected during setup, which requires a known color field 1 reference from a generator (not shown) such as, for example, a Tektronics 1410 or 1411. During set up, the burst phase is adjusted via a variable resistor 35 in the phase shifter 32 (FIG. 2) until the REF ERR signal on line 58 becomes inactive (as indicated, for example, by an indicator lamp (not shown) going out). Then the color field 1 signal on output line 50 is compared to the output of the color field 1 reference generator to determine if they match. If color field 1 on line 50 is 180° out of phase, the position of the jumper 39 is reversed to cause the EX OR gate 72 to invert the incoming SQ BURST signal.

The correlator includes two counters (illustrated at 74 and 76). The first is enabled by CORR START and counts 13.5 MHz reference clock cycles, and produces burst sample pulses during the interval that the plurality of burst cycles are to be sampled. The counter also provides thereafter a state clock pulse (STATE CK) on a line 70. Because of the frequency relationship between 13.5 MHz and burst, there is a relatively easy way to take burst samples. 13.5 MHz is in the neighborhood of 3-times the color subcarrier frequency. In fact, it is somewhat higher, but over a period as short as three subcarrier cycles it is close enough to provide the required function. Namely, one sample is taken during each cycle in such a way as to insure that all samples are taken in similar half-cycles, that is, in positive half-cycles or negative half-cycles. As shown in FIG. 3A,3B, this timing relationship is accomplished by skipping two cycles of 13.5 MHz clock between taking burst samples. The skipped samples are shown as dashed lines, while the samples taken are shown as solid lines. It may be seen that in FIG. 3A,3B, the three samples are taken during the positive half-cycles of the color burst. The first counter in correlator circuit 40 also enables this function and thus further constitutes a sequencer. After the three sample pulses, the counter then generates STATE CK for the state machine circuit 46.

The second counter serves to correlate the sampling results, and is started at a value of zero. If a burst sample is positive the count goes up one. If a burst sample is negative the count goes down one. Thus, it may be seen that it is possible to determine from the output of the second counter whether valid burst is present, as well as determining its phase relative to the sample pulses. If the burst is positive, the final count in the second counter will be +3 and is supplied via the three correlator signals (CORR) and lines 68 as a digital three bit word, 2's complement, of a value +3. If it is negative, the final count will be −3, and is supplied to the lines 68 via the CORR signals as a digital three bit word, 2's complement, of value −3. Any other output indicates an invalid burst. When CORR START becomes inactive it resets the burst correlator circuit 44. The STATE CK pulse on the line 70, which was generated three clock cycles after the last burst sample is taken, is used to advance the state machine 46.

The state machine circuit 46 accepts the 3-bit counter output as its input, and does all processing internally, such as determining if the burst is valid. The correlated burst follows a predetermined sequence for each TV standard, as detected by the state machine circuit 46. For NTSC, the correlated samples will alternate back and forth between +3 and −3 as field 1 and 3 occur, as shown below:

| NTSC | field | 1 | 3 | 1 | 3 | ... |
|---|---|---|---|---|---|---|
|  | sample | +3 | −3 | +3 | −3 | ... |

For PAL and PAL-M the sequence is doubled as fields 1, 3, 5 and 7 occur:

| PAL: | field | 1 | 3 | 5 | 7 | 1 | 3 | 5 | 7... |
|---|---|---|---|---|---|---|---|---|---|
|  | sample | +3 | +3 | −3 | −3 | +3 | +3 | −3 | −3... |

The state machine circuit 46 looks for the appropriate input sequence. Any input other than +3 or −3 is treated as an error and causes the state machine circuit to reset. When the proper sequence for the standard being used is detected, two outputs are produced during color field 1. CF1 on the line 60 goes true for the rest of the frame, and is ANDed with the GATE signal (not shown) within the state machine circuit 46 to generate the CFP signal. CFP on the line 52 thus goes true for one line, and is used to synchronize the flywheel circuit 48. The signal CFP on the line 52 also is used to light an indicator lamp (not shown) to indicate that the detector circuit is detecting a valid color field sequence.

The flywheel circuit 48 includes a counter (not shown) which is clocked by FIELD 1 and operates in generally conventional fashion. CFP resets the counter to a preselected value such as zero. The output COLOR FIELD 1 on the line 50 from the flywheel is true for the duration of color field 1, and is false otherwise. The flywheel circuit 48 is used because the state machine circuit 46 does not provide an output on every color field 1 if the input burst phase is marginal, or if the color field detector circuitry is not properly calibrated.

By way of further description, the circuits 38, 40, 44, 46 and 48 may be an integrated chip such as PAL C 22V10, manufactured, for example, by AMD Corporation, California, each of which are selectively programmed to perform their intended function as described above. More particularly, the programming for the circuits is defined as follows.

Color Field 1 Line Selector 38

|  | Inputs |  |  |
|---|---|---|---|
| Pin |  | 1 = !CSP | Comp Sync clock input |
| Pin |  | 2 = FIELD1 | Odd/Even Field input |
| Pin |  | 10 = !NTSC | PAL/NTSC input |
| Pin |  | 11 = !L525 | 625/525 input |
|  | Outputs |  |  |
| Pin |  | 14 = Q0 | State register output |
| Pin |  | 15 = Q1 | State register output |
| Pin |  | 16 = Q2 | State register output |
| Pin |  | 17 = Q3 | State register output |
| Pin |  | 18 = Q4 | State register output |

| Color Field 1 Line Selector 38 | | | |
|---|---|---|---|
| Pin | | 21 = GATE | 1 line gate output |
| Pin | | 22 = SEL_LIN | Selected line output |
| Pin | | 23 = SELEC | Select output |
| Declarations and Intermediate Variable Definitions | | | |
| FIELD count = [Q4, Q3, Q2, Q1, Q0]; | | | |
| $define FALSE 'b '0 | | | |
| $define TRUE 'b '1 | | | |

The five Q variables serve as a 5 bit counter. When RESET is asserted the counter is reset to zero. When RESET is deasserted, the counter counts up to a value determined by the inputs L525 and NTSC.

Logic Equations

The following three definitions are intermediate variables. They are defined to represent the three TV standards supported by the device.

```
PALM = L525 & !NTSC;
NTC = L525 & NTSC;
PALI = !L525 & !NTSC;
SELEC goes high when the counter reaches the appropriate
value for the desired TV standard.
SELEC = (count;'D'24) & NTC;
APPEND SELEC = (count:'D'25) & PALI;
APPEND SELEC = (count:'D'26) & PALM;
SELEC.oe = TRUE;
SEL_LIN goes high on the line following the counter
values indicated below. This signal is high for just
one line.
SEL_LIN.d = (count:'D'23) & NTC;
APPEND SEL_LIN.d = (count:'D'24) & PALI;
APPEND SEL_LIN.d = (count:'D'25) & PALM;
SEL_LIN.oe = TRUE;
GATE goes high on the line following SEL_LIN. This
signal also goes high for only one line.
GATE.d = SEL_LIN;
GATE.oe = TRUE;
```

The next section defines the counter operation. Up to counter value 24 it operates as a normal counter. After count 24 it skips over a predetermined number of counts to count 27. Once the counter reaches the value 27 it stops counting.

```
SEQUENCE count
present 'D'0                              next 'D'1;
present 'D'1                              next 'D'2;
present 'D'2                              next 'D'3;
present 'D'3                              next 'D'4;
The sequence continues as above from 'D'3 to 'D'22.
present 'D'22                             next 'D'23;
present 'D'23                             next 'D'24;
present 'D'24          if !NTC            next 'D'25;
                       if NTC             next 'D'27;
present 'D'25          if !PALI           next 'D'26;
                       if PALI            nest 'D'27;
present 'D'26                             next 'D'27;
present 'D'27                             next 'D'27;
Q0.sp = FALSE;
Q1.sp = FALSE;
Q2.sp = FALSE;
Q3.sp = FALSE;
Q4.sp = FALSE;
SEL_LIN.sp = FALSE;
GATE.sp = FALSE;
Q0.sp = !FIELD1;
Q1.ar = !FIELD1;
Q2.ar = !FIELD1;
A3.ar = !FIELD1;
Q4.ar = !FIELD1;
SEL_LIN.ar = !FIELD1;
GATE.ar = !FIELD1;
```

| Burst Correlator Control 40 | | | |
|---|---|---|---|
| Inputs | | | |
| Pin | | 1 = DOTCLK | 13.5 MHZ Dot Clock input |
| Pin | | 2 = SELEC | Count Start input |
| Pin | | 10 = !NTSC | PAL/NTSC select input |
| Pin | | 11 = !L525 | 625/525 select input |
| Outputs | | | |
| Pin | | 15 = Q0 | State register output |
| Pin | | 16 = Q1 | State register output |
| Pin | | 17 = Q2 | State register output |
| Pin | | 18 = Q3 | State register output |
| Pin | | 19 = Q4 | State register output |
| Pin | | 20 = Q5 | State register output |
| Pin | | 21 = Q6 | State register output |
| Pin | | 23 = CORRST | Correlator start output |

Declarations and Intermediate Variable Definitions

The next three lines define intermediate variables which represent the three TV standards which are supported by this device.

```
NTC = L525 & NTSC;
PALI = !L525 & !NTSC;
PALM = L525 & !NTSC;
FIELD count = [Q6, Q5, Q4, Q3, Q2, Q1, Q0];
$define FALSE 'b'0
$define TRUE 'b'1
Logic Equations
The output will go true on the terminal count for each
standard.
CORRST.d = (count:'D'81 & NTC) # (count:'D;84 & PALI) #
(count:'D'102 & PALM);
CORRST.oe = TRUE;
```

The seven Q variables serve as a 7 bit counter. When SELEC is low, the counter is reset to zero. When SELEC is high, the counter counts up to the appropriate terminal value.

```
SEQUENCE count
present 'D'0                              next 'D'1;
present 'D'1                              next 'D'2;
present 'D'2                              next 'D'3;
present 'D'3                              next 'D'4;
The sequence continues as above from 'D'3 to 'D'79.
present 'D'79                             next 'D'80;
present 'D'80                             next 'D'81;
present 'D'81          if !NTC            next 'D'82;
                       if NTC             next 'D'81;
present 'D'82                             next 'D'83;
present 'D'83                             next 'D'84;
present 'D'84          if !PALI           next 'D'85;
                       if PALI            next 'D'84;
present 'D'85                             next 'D'85;
```

-continued

| | |
|---|---|
| present 'D'86 | next 'D'87; |

The sequence continues as above from 'D'86 to 'D'101

| | |
|---|---|
| present 'D'101 | next 'D'102; |
| present 'D'102 | next 'D'102; |

Q0.sp = FALSE;
Q1.sp = FALSE;
Q2.sp = FALSE:
Q3.sp = FALSE:
Q4.sp = FALSE:
Q5.sp = FALSE:
Q6.sp = FALSE:
Q0.ar = !SELEC;
Q1.ar = !SELEC;
Q2.ar = !SELEC;
Q3.ar = !SELEC;
Q4.ar = !SELEC;
Q5.ar = !SELEC;
Q6.ar = !SELEC;

Burst Sample Correlator 44

Inputs

| Pin | | | |
|---|---|---|---|
| Pin | 1 = DOTCLK | | 13.5 MHz Dot Clock input |
| Pin | 2 = CORRST | | Sample Start input |
| Pin | 4 = BURST | | Squared Color Burst input |

Outputs

| | | |
|---|---|---|
| Pin 14 = Q0 | | State register output |
| Pin 15 = Q1 | | State register output |
| Pin 16 = Q2 | | State register output |
| Pin 17 = Q3 | | State register output |
| Pin 18 = C0 | | Correlator output |
| Pin 19 = C1 | | Correlator output |
| Pin 20 = C2 | | Correlator output |
| Pin 21 = !CORREL | | Correlator timing output |
| Pin 22 = STATCK | | State Machine Clock pulse |

Declarations and Intermediate Variable Definitions

FIELD count = [Q3, Q2, Q1, Q0];
FIELD sample count = [C2, C1, C0];
$define FALSE 'b'0
$define TRUE 'b'1

The four Q variables serve as a 4 bit counter. When RESET is asserted the counter is reset to zero. The counter then counts up to the terminal value.

The three C variables serve as a 3 bit up/down counter. They are also cleared by RESET. This counter counts when enabled by particular values of the previous counter.

Logic Equations

STATCL is the state machine clock output it goes high for one clock period three clocks after the last burst sample is taken.

STATCK.d = count; 'D'11;
STATCK.oe = TRUE;
SEQUENCE count

| | |
|---|---|
| present 'D'0 | next 'D'1; |
| present 'D'1 | next 'D'2; |
| present 'D'2 | next 'D'3; |
| present 'D'3 | next 'D'4; |
| present 'D'4 | next 'D'5; |
| present 'D'5 | next 'D'6; |
| present 'D'6 | next 'D'7; |
| present 'D'7 | next 'D'8; |
| present 'D'8 | next 'D'9; |
| present 'D'9 | next 'D'10; |
| present 'D'10 | next 'D'11; |
| present 'D'11 | next 'D'12; |
| present 'D'12 | next 'D'13; |
| present 'D'13 | next 'D'14; |
| present 'D'14 | next 'D'15; |
| present 'D'15 | next 'D'15; |

The next line is an intermediate variable that defines when burst samples are to be taken. Samples are taken at three points skipping 2 counter values inbetween.

BSAMP=count; 'D'2#count:'D'5#count:'D'8;

The next two lines are intermediate variables which define when the correlator counter should count up or down.

COR_UP = BSAMP & BURST;
COR_DN = BSAMP & !BURST;
SEQUENCE sample_count

| | |
|---|---|
| present 0 | if COR_UP next 1; if COR_DN next 0; |
| present 1 | if COR_UP next 2; if COR_DN next 0; |
| present 2 | if COR_UP next 3; if COR_DN next 2; |
| present 3 | if COR_UP next 4; if COR_DN next 2; |
| present 4 | if COR_UP next 5; if COR_DN next 3; |
| present 5 | if COR_UP next 6; if COR_DN next 4; |
| present 6 | if COR_UP next 7; if COR_DN next 5; |
| present 7 | if COR_UP next 7; if COR_DN next 6; |

Q0.sp = FALSE;
Q1.sp = FALSE;
Q2.sp = FALSE;
Q3.sp = FALSE;
C0.sp = FALSE;
C1.sp = FALSE;
C2.sp = FALSE;
Q0.ar = !CORRST;
Q1.ar = !CORRST;
Q2.ar = !CORRST;
Q3.ar = !CORRST;
C0.ar = !CORRST;
C1.ar = !CORRST;
C2.ar = !CORRST;
C0.oe = TRUE;
C1.oe = TRUE;
C2.oe = TRUE;

Burst Correlation State Machine 46

Inputs

| | | |
|---|---|---|
| Pin 1 = STATECLK | | State Machine Clock input |
| Pin 2 = !NTSC | | Sequence Control input |
| Pin 4 = C0 | | Correlator input |
| Pin 5 = C1 | | Correlator input |
| Pin 6 = C2 | | Correlator input |
| Pin 8 = GATE | | Output Gate input |

Outputs

| | | |
|---|---|---|
| Pin 14 = Q0 | | State register output |
| Pin 15 = Q1 | | State register |

-continued

| | |
|---|---|
| Pin 17 = Error | output Phase error output |
| Pin 18 = CF1 | Color Field 1 output |
| Pin 19 = CFP | Color Field 1 pulse |

Declarations and Intermediate Variable Definitions

```
FIELD state = [Q1, Q0];
FIELD count = [C2, C1, C0];
$define FALSE 'b'0
$define TRUE 'b'1
```

Logic Equations

There are only two values of correlator input which are acceptable. These are +3 and −3 corresponding to 3 positive burst samples or 3 negative burst samples. Any other correlator value implies that not all samples were to the same polarity and is considered to be an error. The three intermediate variables defined below reflect these conditions.

```
POS = count:'b'011;
NEG = count:'b'101;
ERR = count:'b'001 # count:'b'010 # count:'b'000 #
      count:'b'111 # count:'b'110 # count:'b'100;
```

The ERROR output goes true for at least one frame any time an error has been detected.

```
ERROR.d = ERR;
ERROR.oe = TRUE;
```

The CF1 output goes high for an entire frame after the correct sequence has occurred.

```
CF1.d = state:'D'1 & POS;
CF1.oe = TRUE
```

The CFP output goes true during color field 1 while the GATE input is true.

```
CFP = CF1 & GATE;
CFP.oe = TRUE
```

The state machine looks for sequences of POSitive and NEGative inputs. Any ERRor input causes the state variables to be st back to zero. The sequence that is being looked for depends on whether NTSC is high or low.

| SEQUENCE state | | |
|---|---|---|
| present 'D'0 | if POS | next 'D'2; |
| | if NEG | next 'D'0; |
| | if ERR | next 'D'0; |
| present 'D'1 | if POS | next 'D'2; |
| | if NEG | next 'D'0; |
| | if ERR | next 'D'0; |
| present 'D'2 | if POS & NTSC | next 'D'0; |
| | if POS & !NTSC | next 'D'3; |
| | if NEG | next 'D'1; |
| | if ERR | next 'D'0; |
| present 'D'3 | if POS | next 'D'0; |
| | if NEG | next 'D'2; |
| | if ERR | next 'D'0; |

```
Q0.sp = FALSE;
Q1.sp = FALSE;
ERROR.sp = FALSE;
CF1.sp = FALSE;
Q0.ar = FALSE;
Q1.ar = FALSE;
ERROR.ar = FALSE;
CF1.ar = FALSE;
```

Color Field 1 Fly Wheel 48

| Inputs | | |
|---|---|---|
| Pin 1 = FIELD1 | | Fly Wheel Clock input |
| Pin 2 = !NTSC | | Sequence Control input |
| Pin 4 = CFP | | Color Field 1 reset input |
| Pin 8 = BURST | | Squared burst input |
| Pin 9 = BRST_INV | | Burst invert control |
| Outputs | | |
| Pin 14 = !Q0 | | Counter output |
| Pin 15 = !Q1 | | Counter output |
| Pin 17 = COLOR_ID | | Color field 1 id pulse |
| Pin 23 = SW_BRST | | Switched Burst |

Declarations and Intermediate Variable Definitions

```
FIELD count = [Q1, Q0];
$define FALSE 'b'0
$define TRUE 'b'1
```

Logic Equations

The SW_BRST output has nothing to do with the flywheel, but is placed in this device for convenience. The squared BURST input and the BRST_INV signal are exclusive ORed together to produce the SW_BRST output. This provides an easy way for an external controller to invert the squared burst to move the detection sequence by 180 degrees.

SW_BRST=BURST $ BRST_INV;

The COLOR_ID output goes true during FIELD 1 when the appropriate count occurs.

```
COLOR_ID = NTSC & !Q0 & !FIELD1;
APPEND COLOR_ID = !NTSC & count:'D'0 & !FIELD1;
COLOR_ID.oe = TRUE;
```

The counter is a simple 2 bit down counter. It is reset to zero by the CFP input.

| SEQUENCE count | |
|---|---|
| present 'D'0 | next 'D'3; |
| present 'D'1 | next 'D'0; |
| present 'D'2 | next 'D'1; |
| present 'D'3 | next 'D'2; |
| Q0.sp = FALSE; | |
| Q1.sp = FALSE; | |
| Q0.ar = CFP; | |
| Q1.ar = CFP; | |

Figure 2:
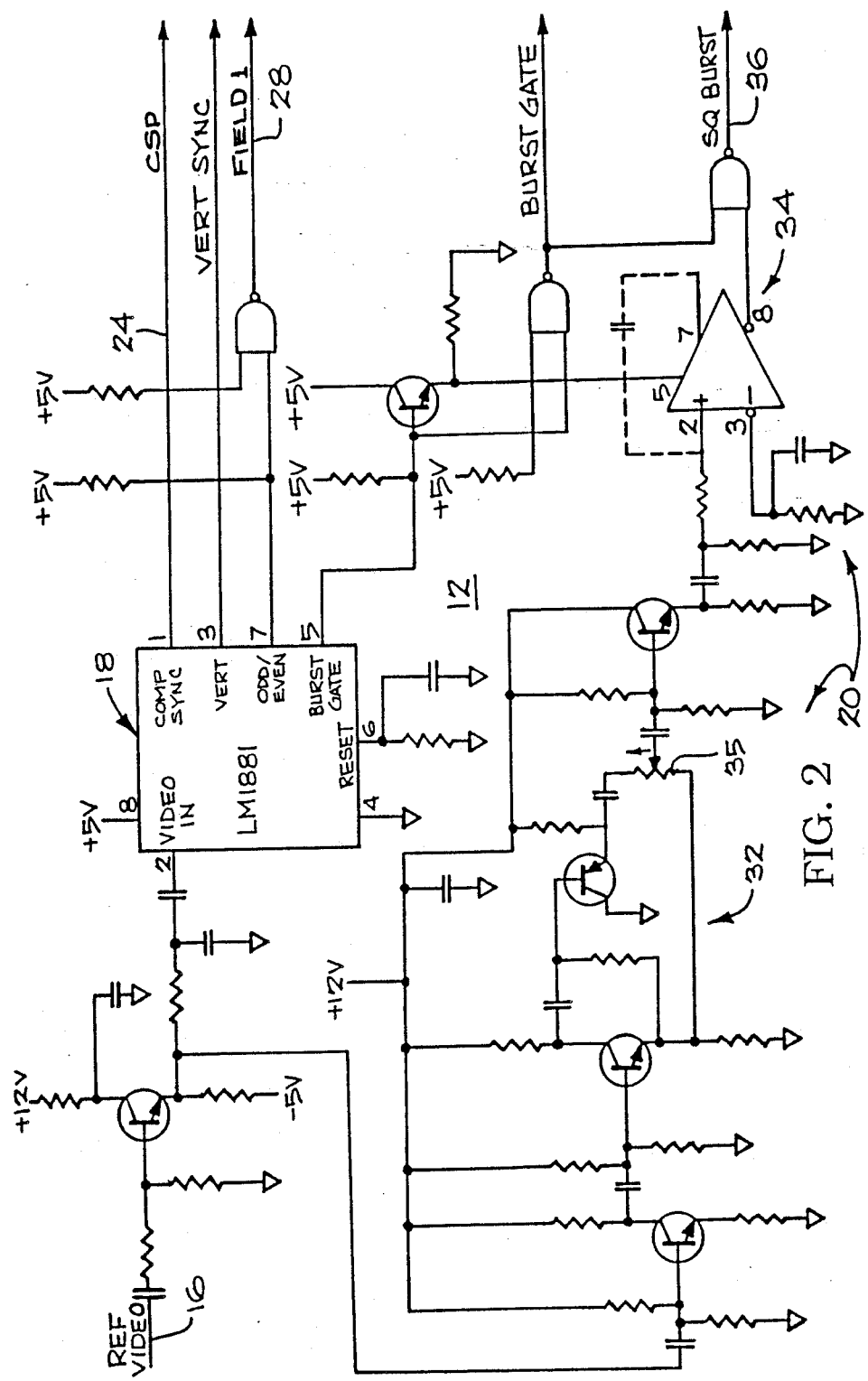
FIG. 2 is a schematic diagram of an implementation of the analog section of the diagram of FIG. 1.

Referring now to FIG. 2, wherein like components are similarly numbered in the Figures, an implementation of the analog processor section 12 is shown in schematic by way of example only. REF VIDEO is supplied on the line 16 to the sync stripper/odd/even field detector 18, as well as to the burst phase shifter 32 of the burst processor circuit 20. The stripper/detector which may be, for example, an LM1881 integrated chip made by National Semiconductor, delivers the CSP signal on the line 24, and the FIELD 1 signal on the line 28. CSP and FIELD 1 are fed directly to the digital processor section 14. V SYNC and BURST GATE are used elsewhere in the apparatus and are not of specific interest herein.

The burst phase shifter 32 includes four transistors, wherein the first transistor is a high pass filter and gain stage. The next two transistors are phase shift amplifiers. The fourth transistor is a low impedance driver for the burst slicer 34. A variable resistor 35 varies the phase shift linearly over a 90 degree range, and provides the phase shift adjustment required to adjust the phase shift of the color burst until REF ERR on the line 58 becomes inactive, as previously mentioned. The burst slicer 34 is a high speed comparator, whose output is latched except during the burst gate interval. The output of burst slicer 34 supplies the SQ BURST signal on the line 36.

Although the invention has been described herein with specific values and parameters, it is to be understood that various modifications thereto are contemplated. For example, a DOT CLK reference clock signal of other than the preferred 13.5 MHz frequency may be used. The frequency may be an integer multiple of the line rate, which is greater than the subcarrier frequency, and must be locked to the line rate. Thus, for example, a frequency of 27, 54, etc., MHz may be used to provide the reference clock signal for the various color television standards. In addition, the number of samples taken may be other than three. One sample would provide information, however would not allow correlation. Thus, in a practical system, two to eight samples could be taken within similar half-cycles of the color burst interval, the number selected being consistent with the frequency of DOT CLK to allow skipping selected clocks. A larger number of samples would require a four bit word for the CORR signals, rather than the three bit word shown.

What is claimed is:

1. A circuit for detecting a color field of a color field sequence in a color video signal having a horizontal sync and a color burst signal derived from a color subcarrier, comprising:
   means for providing a reference clock having a frequency substantially higher than the frequency of the color subcarrier and which is locked to horizontal sync;
   means responsive to the providing means for sampling a plurality of similar half-cycles of the color burst signal to provide a like plurality of samples of positive or negative polarity; and
   means responsive to the sampling means for detecting the sequence of polarities of a succession of the plurality of samples, and thus said color field of the color field sequence.

2. The circuit of claim 1 wherein the providing means provides a reference clock of the order of three times the frequency of the color subcarrier.

3. The circuit of claim 1 including
   first means for counting a selected number of cycles of the reference clock;
   the sampling means being responsive to said first counting means, for sampling the color burst signal in similar half-cycles of the plurality of cycles; and
   means responsive to the sampling means for determining the polarity of the color burst samples.

4. The circuit of claim 3 wherein:
   said reference clock has a frequency of approximately 13.5 megaHertz;
   said number of burst samples taken is at least two; and
   said sampling means skips two cycles of the 13.5 megaHertz sample clock between taking the burst samples.

5. The circuit of claim 3 wherein the selected number of cycles counted causes the sampling to occur at substantially the center of the color burst.

6. The circuit of claim 5 wherein the center of burst is located at approximately 81 reference clock cycles for NTSC, 84 reference clock cycles for PAL, or 102 reference clock cycles for PAL-M, given a reference clock of approximately 13.5 megaHertz.

7. The circuit of claim 3 wherein said determining means includes:
   second counting means for counting up if a burst sample is positive, and for counting down if a burst sample is negative;
   said second counting means supplying a positive final count upon counting up and a negative final count upon counting down.

8. The circuit of claim 7 wherein the detecting means includes:
   state means responsive to the first counting means for detecting the sequence of positive and negative final counts received from the second counting means.

9. The circuit of claim 1 wherein said sampling means is responsive to a selected number of reference clocks for sampling the color burst signal in similar half-cycles of the plurality of cycles to provide sample groups of said positive or negative plurality of samples.

10. The circuit of claim 9 wherein said detecting means includes a state machine for determining preselected sequences of the polarities of said sample groups to define the color field 1 of the corresponding detected sequence.

11. The circuit of claim 10 including:
   a flywheel circuit coupled to the state machine and responsive to a selected color television standard, for maintaining the detection of the color field 1 sequence for successive durations of color field 1.

12. A circuit for detecting a color field sequence in a color video signal of a preselected color television standard, the color video signal having a horizontal sync, and a color burst derived from a color subcarrier, comprising:
   means responsive to the horizontal sync for locating a preselected point in time of the color burst relative to horizontal sync;
   means responsive to the locating means for sampling a selected plurality of similar half-cycles of the color burst at said preselected point;
   means receiving a succession of the selected pluralities of samples half-cycles for determining the polarities of each plurality;
   means responsive to the determining means for detecting the sequence of polarities of the succession of the selected pluralities to thus detect said color field sequence of the corresponding preselected color television standard.

13. The circuit of claim 12 wherein the locating means includes:

means for providing a clock having a frequency substantially higher than that of the color subcarrier; and means receiving the clock for generating a control signal after the occurrence of a preselected number of clock cycles commensurate with the preselected color television standard.

14. The circuit of claim 13 wherein the frequency of said clock is an integer multiple of the frequency of the color subcarrier.

15. The circuit of claim 13 wherein the number of samples in a plurality is of approximately from two to eight.

16. The circuit of claim 12 wherein:

said sampling means includes means for producing burst sample pulses which occur during a cycle with such timing as to insure that each of a plurality of samples are taken in similar half-cycles of the color burst; and said determining means includes means responsive to the producing means for correlating the samples to determine the polarity of each plurality of samples.

17. The circuit of claim 12 wherein the four means are each formed of a PAL C 22V10 integrated chip selectively programmed to perform the respective functions of locating, sampling, determining and detecting.

18. A method for detecting a color field in a color field sequence of a color video signal having a horizontal sync and a color burst derived from a color subcarrier, comprising:

determining the location in time of a point within the color burst relative to the horizontal sync;

taking a selected plurality of samples in a corresponding plurality of similar half-cycles of the color burst at said point in time;

determining the polarities of successive pluralities of samples; and detecting the sequence of the determined polarities of the successive pluralities to thus detect said color field.

19. The method of claim 18 wherein the step of determining includes:

providing a clock signal having a frequency substantially higher than that of the color subcarrier and which is locked to the horizontal sync; and counting a preselected number of clocks to determine the location in time of said point.

20. The method of claim 18 wherein the step of taking includes:

sampling a plurality of similar halfcycles of the color burst at said point in time; and correlating the resulting samples to determine the polarity of the color burst samples.

21. The method of claim 18 wherein the step of detecting includes:

establishing a selected sequence of positive and negative sample groups indicative of the color field sequence for a preselected color television standard; and detecting the actual sequence of positive and negative sample groups to determine the color field for the color television standard being used.

* * * * *